April 14, 1964   R. L. NELSON   3,128,894
END GATE MOUNTED GRAIN AUGER
Filed April 3, 1961   2 Sheets-Sheet 1

INVENTOR.
R.L. NELSON
BY

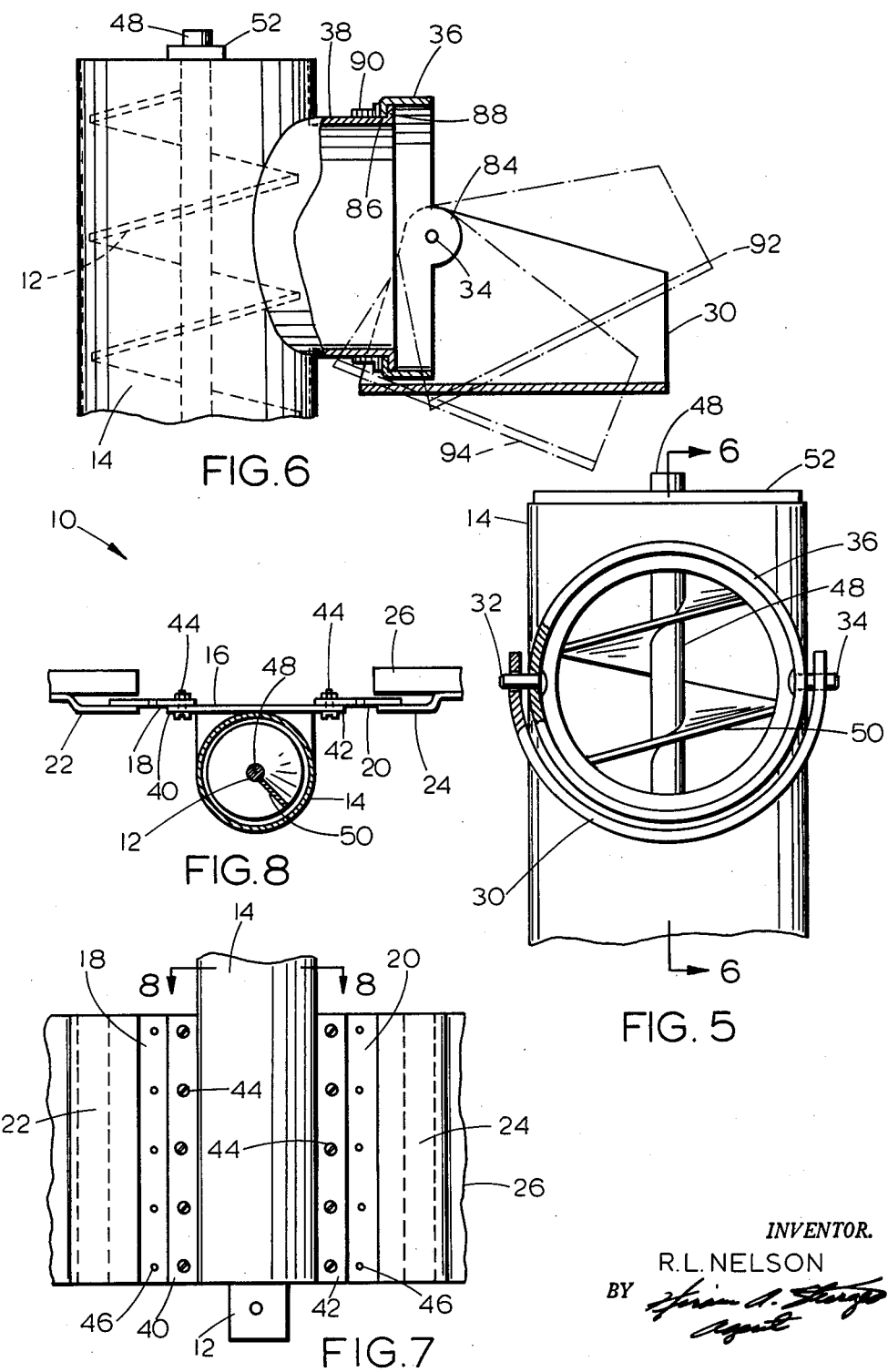

3,128,894
END GATE MOUNTED GRAIN AUGER
Robert L. Nelson, Rte. 2, Atlantic, Iowa
Filed Apr. 3, 1961, Ser. No. 100,437
2 Claims. (Cl. 214—509)

This invention has as its object to provide a grain elevating mechanism mounted on an end gate for use in substitution for the end gate of a conventional end gate truck and it is a still further object to provide a laterally adjustable end gate of variable horizontal width to fit end gate openings of various sizes.

Heretofore farmers have had available to them grain vehicles with permanently attached grain elevating mechanisms. However, these costly specialized pieces of equipment are not useful for many other purposes. Farmers do have high investment in trucks which are versatile and are useful for many other purposes.

It has been proposed heretofore to provide means mounted through an end gate opening of a truck and supporting a grain elevating auger, for making use of a truck with this assembly as a grain carrying and elevating facility.

However, different makes of trucks have varying sizes of end gate openings. As a result, the American market has not seen wide sale of end gate mounted augers even though they are economical and make possible the versatile double use of a truck.

It is, therefore, an object of this invention to make it possible for manufacturers to afford to merchandise end gate augers.

It is specifically an object to provide a laterally adjustable end gate with grain auger or elevating mechanism attached, for the variable width made possible to fit with versatility the many types of trucks with their many variations in width of end gate openings, to the end that this type of product can have its full benefit to the country's economy.

It has been proposed that a scoop with auger attached be mounted through an end gate opening. It is an object of my invention to mount a lift auger strongly on an auxiliary grain door itself to take advantage of the brackets on standard end gates which are of study and heavy construction.

A further object is to provide a more effective and economical mechanism for directing the flow of grain transversely of the upper end of an auger or grain elevating mechanism as is particularly effective for the control of the direction of the grain flow and also for control of the angle of grain flow with respect to the vertical, this latter being accomplished by an adjustable chute independently of the particular inclination of an auger itself with respect to the vertical, the same being efficient, durable, and economical.

Other and further objects and advantages of the present invention will be apparent from the following detailed description, drawings and claims, the scope of the invention not being limited to the drawings themselves as the drawings are only for the purpose of illustrating a method in which the principles of this invention can be applied.

Other embodiments of the invention utilizing the same or equivalent principles may be used and structural changes may be made as desired by those skilled in the art without departing from the present invention and the purview of the appended claims.

In the drawings:

FIGURE 5 is a rear elevational view showing the upper end of the lift auger assembly showing a chute pivotally mounted on the auger housing, with the parts shown on an enlarged scale, and with part broken away and shown in section to illustrate the pivotal connection at one side of the housing.

FIGURE 6 is a side elevational view showing the upper end of the lift auger with the lower portion broken away, and also with the chute mounting broken away on line 6—6 of FIGURE 5.

FIGURE 7 is a rear elevational view of the dump wagon showing the mounting of the lift auger on a grain door of an endgate with parts of the endgate and auger housing broken away.

FIGURE 8 is a sectional plan taken on line 8—8 of FIGURE 7 also illustrating the mounting of the lift auger on the endgate.

Figure 1:
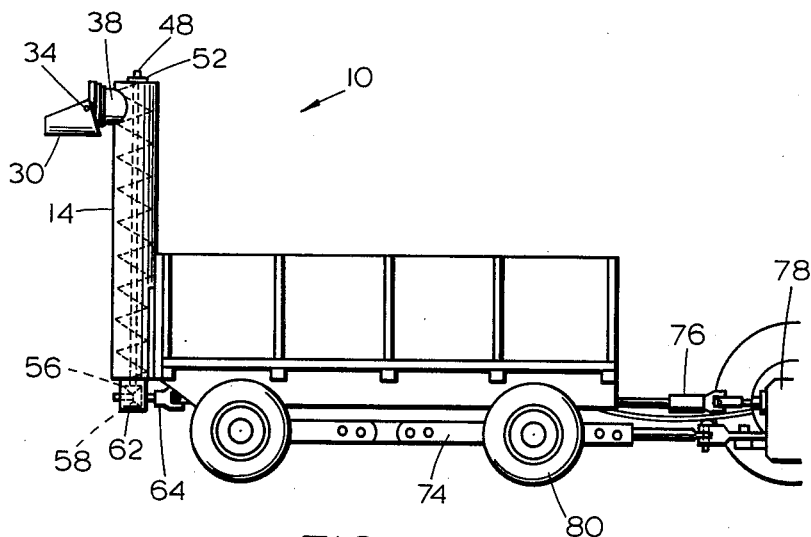
FIGURE 1 is a side elevational view of a dump wagon showing a lift auger mounted on a grain door in the endgate thereof and showing the wagon attached to a tractor.

While one embodiment of the invention is illustrated in the above-referred-to drawings, it is to be understood that they are merely for the purpose of illustration and that various changes in construction may be resorted to in the course of manufacture in order that the invention may be utilized to the best advantage according to circumstances which may arise without in any manner departing from the spirit and intention of the device, which is to be limited only in accordance with the appended claims. And while there is stated the primary field of utility of the invention it remains obvious that it may be employed in any other capacity wherein it may be found applicable.

In the accompanying drawings and in the following specification, the same reference characters are used to designate the same parts and elements throughout, and in which the numeral 10 refers to the invention in its entirety, numeral 12 indicating a lift auger in a housing 14, numeral 16 indicating an end gate or grain door on which the housing 14 is mounted, numerals 18 and 20 side plates of the endgate 16, the side plates 18 and 20 being slidably mounted in rails 22 and 24 of an end wall 26 of a dump wagon 28, and numeral 30 indicating a chute pivotally mounted by pins 32 and 34 on a collar 36 of a sleeve 38 extended rearwardly from the upper end of the auger housing 14.

The lift auger housing 14 is provided with flanges 40 and 42 which are secured by bolts 44 to the side plates 18 and 20, and the side plates are provided with spaced rows of openings 46, that are positioned to receive the bolts, thereby providing means for adjusting the width of the endgate or grain door 16 of the end wall 26.

The lift auger 12 includes a shaft 48 with a spiral vane 50 thereon, and the periphery of the vane substantially engages the inner wall of the housing 14. The upper end of the shaft is rotatably mounted in a bar 52 on the upper end of the housing, and the lower end is designed to receive a flexible shaft 54, or the lower end may be provided with a bevel gear 56 that meshes with a similar gear 58 on a stub shaft 60 rotatably mounted in a gear box 62. The stub shaft 60 is provided with a universal joint 64 from which a telescoping shaft 66 extends and the opposite end of the shaft 66 is provided with another universal joint 68. The universal joint 68 is positioned on a shaft 70 rotatably mounted in bearings 72 on a chassis 74 of the dump wagon 28, and the shaft 70 is connected by a universal joint 76 to the power take-off of a tractor 78. The chassis 74 is provided with wheels 80 and the forward end of the body or box is elevated by conventional wagon or truck dumping means 82.

The chute 30 is pivotally mounted by the pins 32 and 34 in ears 84 of the collar 36, and the inner end of the collar is provided with an inwardly extended flange 86 that is retained against a flange 88 on the end of the sleeve 38 by an inner ring 90, as shown in FIGURE 6. By this means the chute is free to turn and also swing upwardly and downwardly on the pivot pins from the position shown in full lines to the positions indicated by the broken lines 92 and 94.

*Operation*

Figure 2:
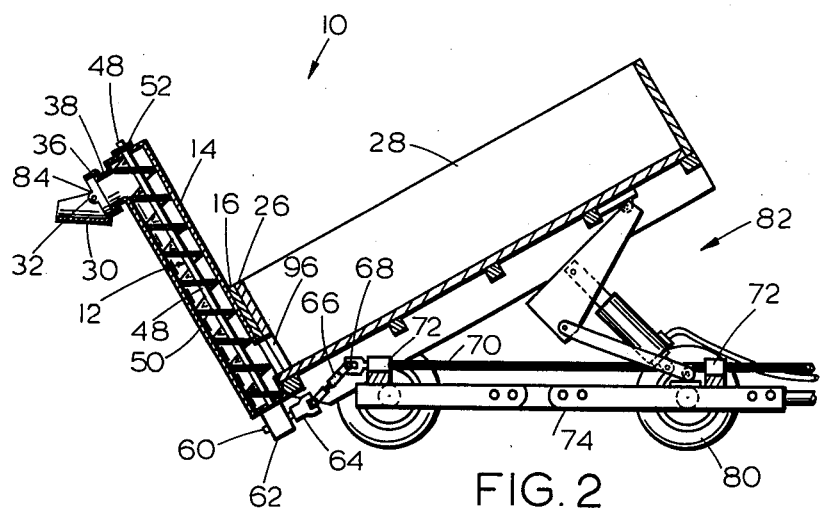
FIGURE 2 is a longitudinal section through a dump wagon, such as that shown in FIGURE 1, showing the wagon body in a dumping position, and also showing a lift auger on the endgate thereof.
Figures 3, 4:
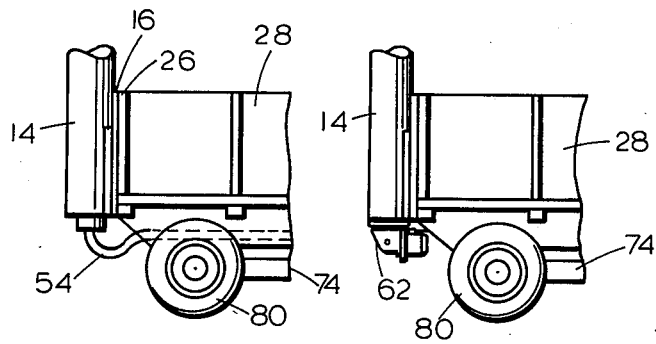
FIGURE 3 is a side elevational view showing the rear portion of a dump wagon having a lift auger on the endgate thereof and showing a flexible shaft for actuating the auger from the power take-off of a tractor.
FIGURE 4 is a side elevational view, similar to that shown in FIGURE 3, illustrating an assembly through which a lift auger is actuated from a power take-off of a tractor.

In use the screw conveyor or lift auger is mounted on a grain door of an endgate of a dump wagon or truck, and in tilting the box from the position shown in FIGURE 1 to that shown in FIGURE 2 the grain flows downwardly to the opening 96 in the end wall 26 and through the opening into the lift auger which carries the grain upwardly to the sleeve 38 and chute 30. Actuating the box from the position shown in FIGURE 1 to that shown in FIGURE 2 lowers the chute 30, and bringing the box back to a horizontal position elevates the chute.

Mounting the lift auger on the end gate or grain door 16 of the end wall 26 makes it possible for the farmer to set the width of the mounting in a permanent position, and also, with the lift auger on the grain door it is only necessary to lift the auger in removing the lift auger from the dump wagon. The lift auger may, therefore, be installed and removed by one man.

From the foregoing description it is thought to be obvious that an endgate mounted grain auger constructed in accordance with my invention is particularly well adapted for use, by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention, except as claimed.

Having now described the invention that which is claimed to be new and desired to be procured by Letters Patent is:

1. In combination: a dump wagon box having a rear wall, said rear wall having an end gate opening therein, end gate receiving track means attached to said rear wall on each side of said opening for vertically slidably receiving an end gate, an end gate slidably mounted in said track means and positioned to cover said opening, said end gate having a grain opening therethrough, an elongated grain elevating mechanism mounted on said end gate and having a lower end in communication with said end gate grain opening and said elevating mechanism having a grain exit opening at its upper end, said end gate having a plurality of sections adjustably secured together for horizontal movements with respect to each other whereby the total width of said end gate can be varied to adjust to wagon boxes having end gate openings of different widths.

2. For use with a dump wagon having a rear wall, said rear wall having an end gate opening therein and end gate receiving track means attached to said rear wall on each side of said end gate opening for vertically slidably receiving an end gate, the following: an end gate slidably mountable in said track means and positionable to cover said end gate opening, said end gate having a grain opening therethrough, an elevated grain mechanism mounted on said end gate and having a lower end in communication with said end gate grain opening, and said elevating mechanism having a grain exit opening at its upper end, said upper end of said grain elevating mechanism having a cylindrical sleeve projecting laterally therefrom and disposed in communication with said grain exit opening, a collar disposed around said sleeve and rotatable with respect thereto, means for maintaining said collar or said sleeve in said rotating relationship, and a chute having open ends and an open upper side, said chute having side walls, means for attaching said chute to said collar for pivotal movement of said chute with respect to said collar such that the bottom of said chute can be inclined into various positions with respect to the axis of said cylindrical sleeve to direct the flow of grain.

References Cited in the file of this patent

UNITED STATES PATENTS

| | | |
|---|---|---|
| 2,506,684 | Saboe | May 9, 1950 |
| 2,730,256 | Louden | Jan. 10, 1956 |
| 2,751,097 | Miller | June 19, 1956 |
| 2,767,963 | Ringen | Oct. 23, 1956 |
| 2,772,764 | McClellan | Dec. 4, 1956 |

FOREIGN PATENTS

| | | |
|---|---|---|
| 795,679 | Great Britain | May 28, 1958 |